(12) United States Patent
Callaway

(10) Patent No.: US 12,138,984 B2
(45) Date of Patent: Nov. 12, 2024

(54) PROGRESSIVE SUSPENSION DESIGN UTILIZING ARM MOUNTED PIVOT BRACKET

(71) Applicant: Kevin Callaway, El Cajon, CA (US)

(72) Inventor: Kevin Callaway, El Cajon, CA (US)

(*) Notice: Subject to any disclaimer, the term of this patent is extended or adjusted under 35 U.S.C. 154(b) by 0 days.

(21) Appl. No.: 17/944,991

(22) Filed: Sep. 14, 2022

(65) Prior Publication Data
US 2024/0083206 A1  Mar. 14, 2024

(51) Int. Cl.
*B60G 7/00* (2006.01)

(52) U.S. Cl.
CPC ............. *B60G 7/001* (2013.01); *B60G 7/008* (2013.01); *B60G 2204/10* (2013.01); *B60G 2204/421* (2013.01); *B60G 2204/43* (2013.01)

(58) Field of Classification Search
CPC .... B60G 7/001; B60G 7/008; B60G 2204/10; B60G 2204/421; B60G 2204/43
See application file for complete search history.

(56) References Cited

U.S. PATENT DOCUMENTS

| | | | |
|---|---|---|---|
| 2017/0327207 A1* | 11/2017 | Sierra | B60G 3/20 |
| 2022/0111692 A1* | 4/2022 | Berardi | B60G 3/20 |
| 2022/0339984 A1* | 10/2022 | Starik | B60G 3/20 |

FOREIGN PATENT DOCUMENTS

WO  WO-2022079716 A1 *  4/2022  ........... B60G 13/005

\* cited by examiner

*Primary Examiner* — Jason D Shanske
*Assistant Examiner* — Matthew James O'Neill

(57) ABSTRACT

The present disclosure provides a suspension assembly system for use in a vehicle or moving object where vibration reduction and isolation is desired. The suspension assembly system includes at least two support arms connected by a linkage and a pivoting bracket. One support arm attaches to the linkage at a connection point and the linkage also attaches to the pivoting bracket at a second connection point. The second support arm is attached to a second location on the pivoting bracket. A shock absorbing assembly is also attached to the pivoting bracket near the second connection point providing an angular connection between the support arms and the shock assembly. This allows the combined movement of the support arms through actuation of a shock assembly and its connection to the pivoting bracket inducing angular rotation of the pivoting bracket. This creates a new path line for a shock mount to move independently of the support arms and improves the progressiveness of the shock assembly.

The detailed description and the drawings support and describe the disclosure and provides the best modes and other embodiments for carrying out the claims. However, the scope of the disclosure is solely defined by the claims.

7 Claims, 5 Drawing Sheets

PROGRESSIVE SUSPENSION DESIGN UTILIZING ARM MOUNTED PIVOT BRACKET

TECHNICAL FIELD

The present disclosure relates to a suspension assembly system typically used in a vehicle.

BACKGROUND

Suspension assembly systems are used to damp the impact of a terrain on which a vehicle is travelling to provide passengers within said vehicle a smoother and more comfortable ride. With manufacturer limitations on packaging suspension components, it is typical for a suspension system to have digressive leverage ratios and digressive shock velocities. Increasing the progressiveness of the movement and leverage ratio provides additional comfort and safety to occupants of a vehicle as the suspension is utilized near the extremes of movement. It would be a significant improvement over the current state of the art to have a design that increases the progressiveness of a suspension assembly while using standard suspension mounting locations.

BRIEF DESCRIPTIONS OF THE DRAWINGS

DETAILED DESCRIPTION

Figure 1:
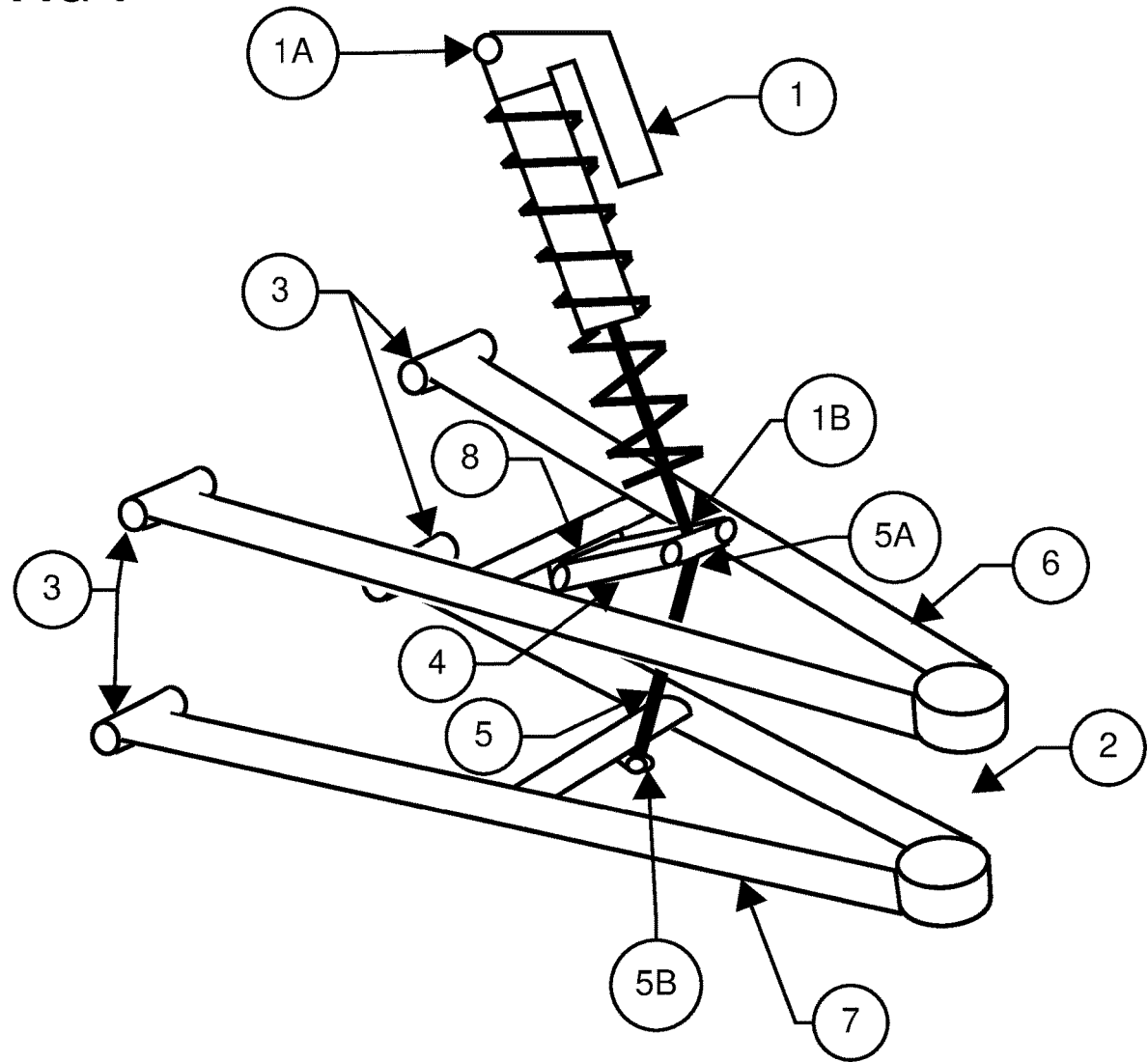
FIG. 1 is a schematic of the suspension assembly system of the invention.
Figure 2:
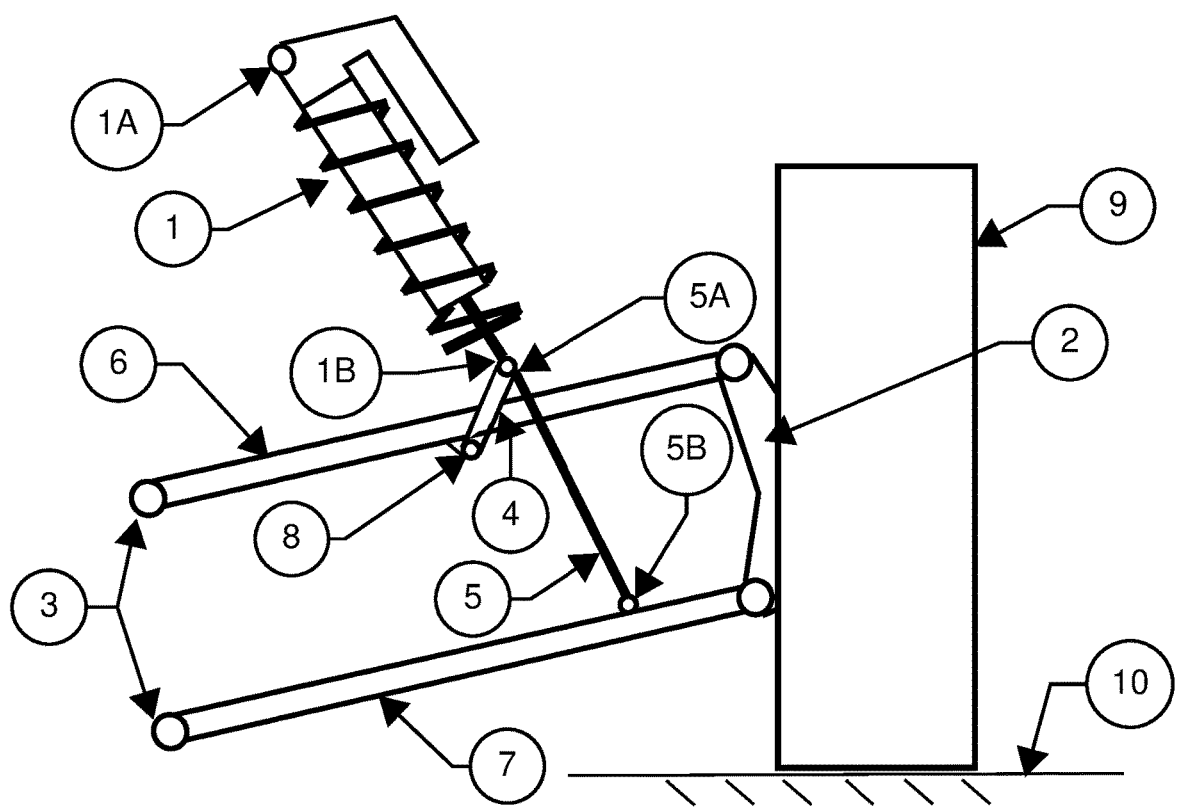
FIG. 2 is a schematic of the suspension assembly system in its fully compressed position.
Figure 3:
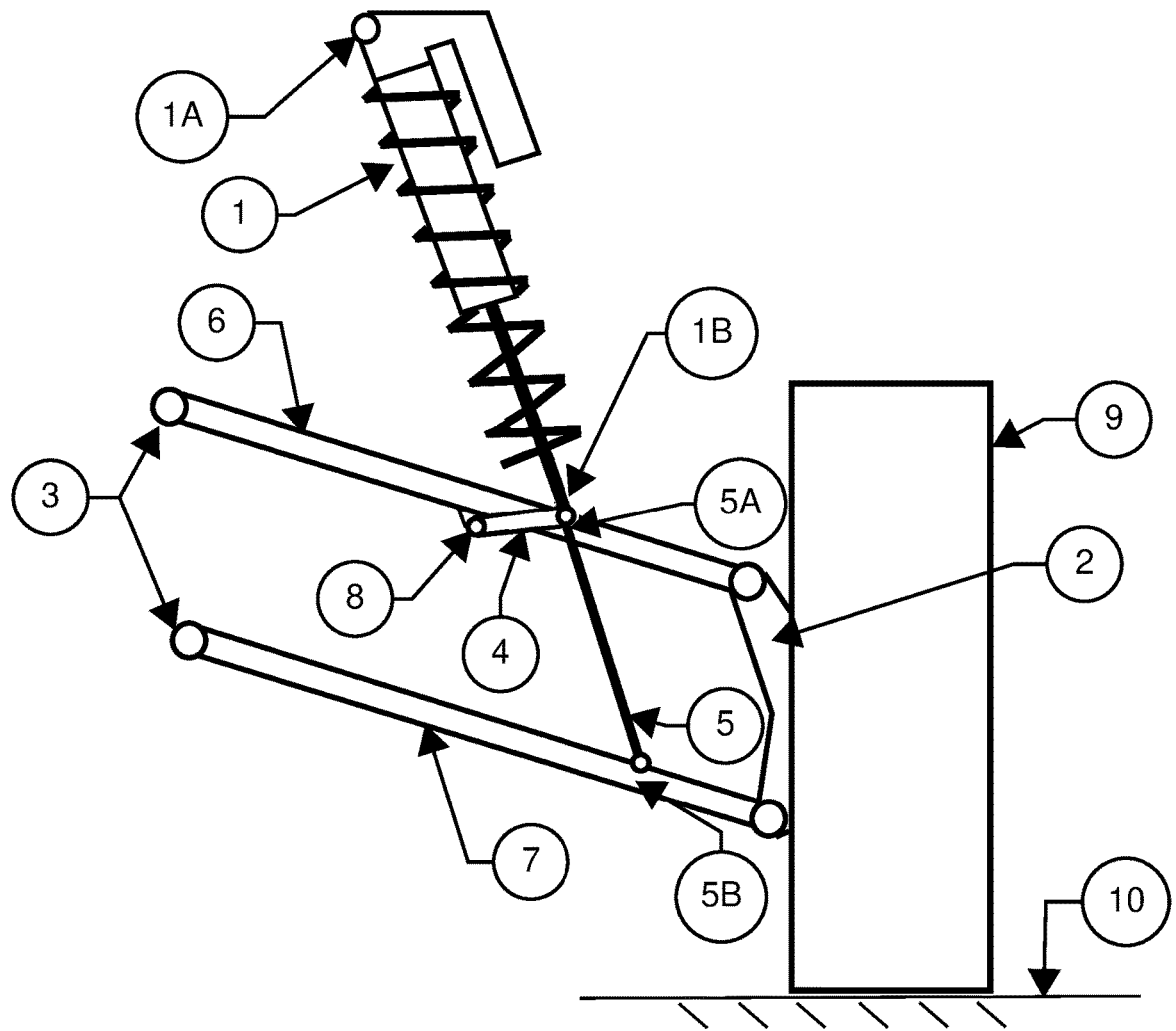
FIG. 3 is a schematic of the suspension assembly system in its fully extended position.

In reference to the drawings specifically, a Suspension System Assembly is shown (FIG. 1) exhibiting a first support arm (6) and a second support arm (7) connected to one another through a linkage system (5) and a pivoting bracket (4). The pivoting bracket (4) is mechanically connected (8) to the first support arm (6) and to the distal end (1B) of the shock assembly (1). The pivoting bracket (4) is also mechanically connected at (5A) to a linkage system (5). The linkage system (5) is mechanically connected (5B) to the second support arm (7). The first and second support arms (6 and 7) are also connected to a ground tracking instrument (9), by an intermediate device (2), such as a spindle (FIGS. 2 and 3), which ground tracking instrument (9) has contact to an undulating surface (10). The surface (10) creates shock impulses and forces through the ground tracking instrument (9) on the entire suspension system assembly (FIG. 1). The impulses and forces are uniquely damped by the connection (8) of the pivoting bracket (4) to the first support arm (6) and the second support arm (7) by the linkage system (5) at connection point (5B) by transferring the impulses and forces to the pivoting bracket (4) through the linkage system connection point (5A) to the distal end (1B) of the shock absorbing assembly (1).

Figure 5:
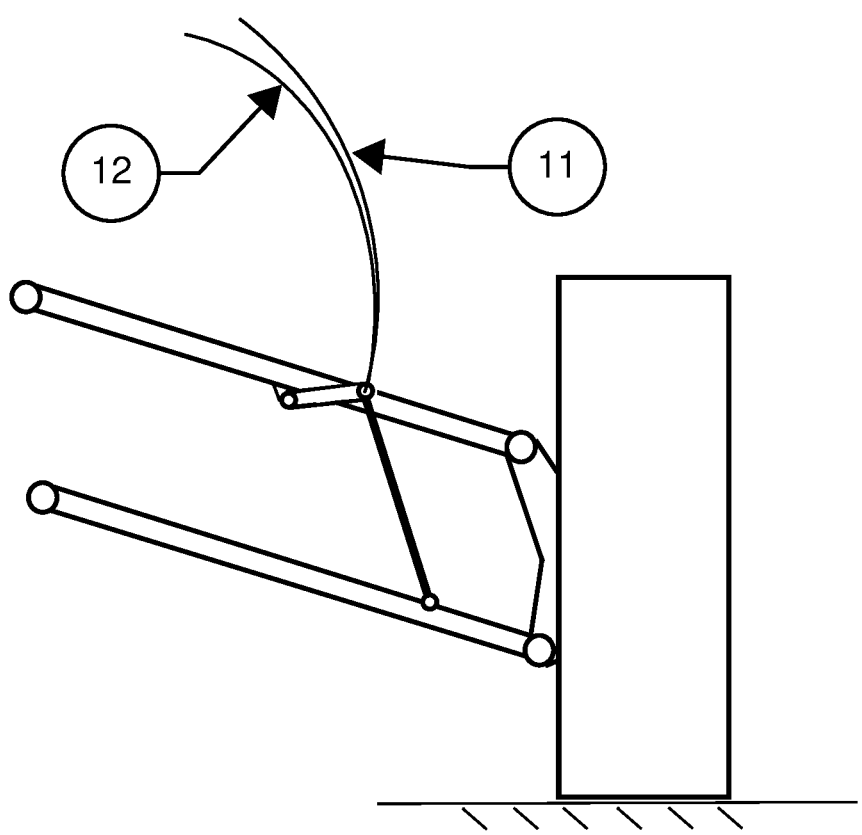
FIG. 5 is a schematic showing the new path line of the suspension assembly system

The connection (8) of pivoting bracket (4) allows for angular rotation of the distal end (1B) of the shock assembly (1). When the first support arm (6) and the second support arm (7) rotate about their connections to the chassis (3) the angular rotation of pivoting bracket (4) enables the distal end (1B) of the shock assembly (1) to move across a new path (12) (FIG. 5) that is not achievable by a fixed connection (11) to either the first or second support arm (6 or 7) providing a unique and independent shock leverage and velocity. A new leverage ratio allows the shock to have less leverage at extended positions (FIG. 3) and more leverage at or near compressed positions (FIG. 2) giving a more progressive force rate. The change in velocity ratios similarly reduces shock velocities at extended positions and increases velocities at or near collapsed positions gives increasing damping ability.

Figure 4:
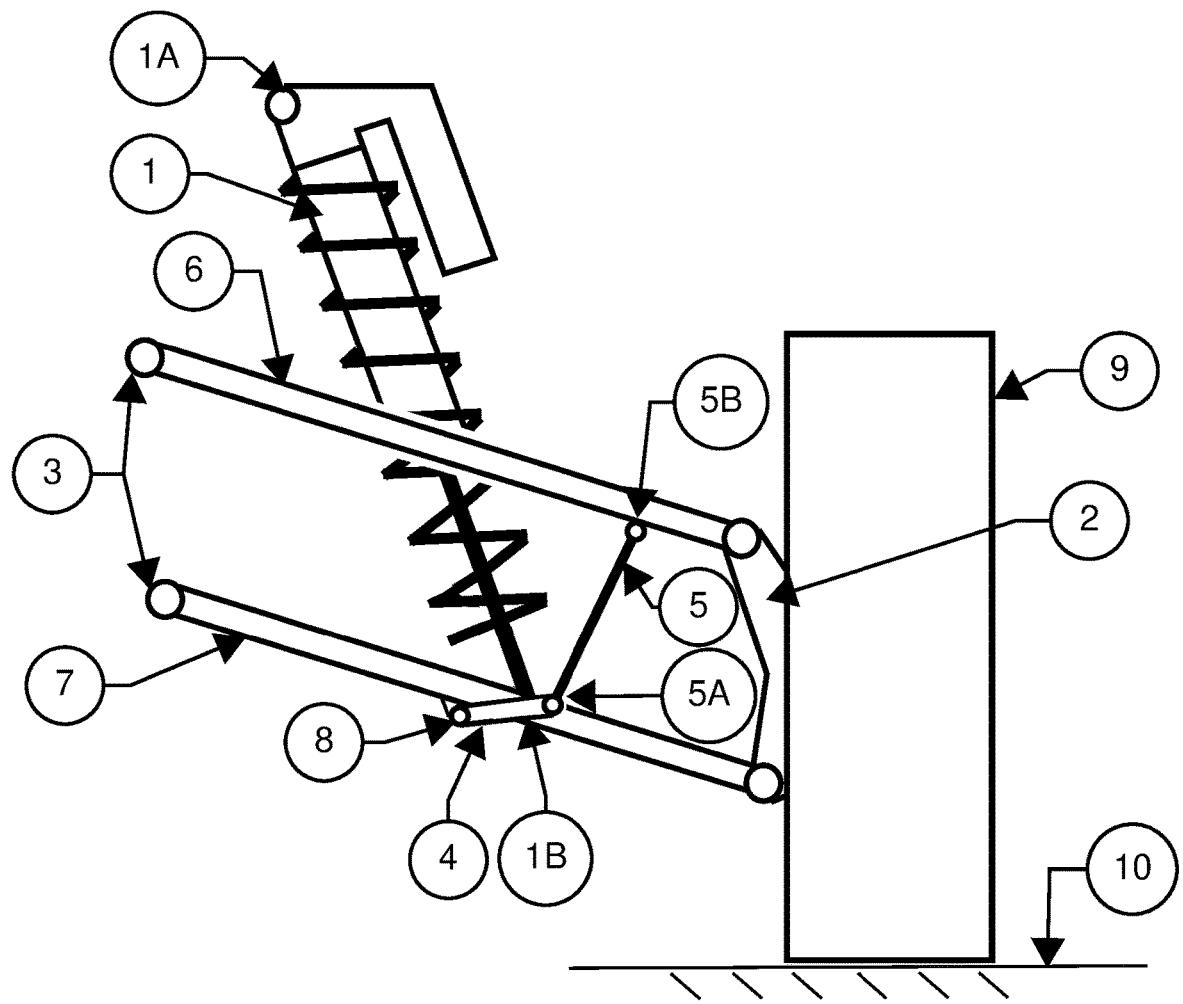
FIG. 4 is schematic of the suspension assembly system in a reverse configuration.

In certain embodiments, the support arms (6 and 7) may be of different length and longer arms are typically found in off-road applications. As the support arm length increases, the ability to increase the progressiveness improves. In small bump design focused suspension systems, similar to on-road vehicles, shorter support arms or shorter shock strokes the ability to increase progressiveness decreases but remains. The support arms (6 & 7) may also be of any design including A frame, J shape, boxed, tubed, solid or any combination thereof. Additionally, the positions of the support arms (6 and 7) may be inverted or rearranged such that the pivoting bracket (4) is connected to a support arm (6 or 7) in a lower position with respect to the other support arm (7 or 6). This configuration would place the mechanical linkage connection (5B) on the support arm (7 or 6) in the upper position. (FIG. 4)

In other embodiments, the pivoting bracket (4) may be linear, curved or L shaped and the connection to support arm (6) may be located between the intermediate device (2) and the connections to the chassis (3). The connection point (8) of pivoting bracket (4) may be a hinge, a multi-joint, a gear, or other axial rotating mechanical connection. This disclosure does not limit a specific rotating mechanical connection.

In yet other embodiments, the linkage system (5) is a rigid rod between two points (5A and 5B) where the connections (5A and 5B) are ball and socket, ball or roller bearings or bushings or other full or partially rotating mechanical connection.

The Suspension System Assembly may be utilized in any type of vehicle including one powered by an internal combustion engine, a motor driven, any hybrid version, or an object connected to a vehicle. The suspension system assembly (CC) may also be used in either or both of a front and rear suspension system. Additionally, the suspension system assembly (FIG. 1) could be used to dampen any physical space where undulations from an instrument in contact with an external surface create shock impulses to said physical space.

Various modes of enabling the disclosure are detailed in the description and a person having ordinary skill in the art will recognize additional embodiments for practicing the disclosure as defined within the breadth of the appended claims. All embodiments in the description and exhibited in the drawings are not necessarily exclusive of one another but may be described in various combined embodiments or in a single embodiment combining all characteristics described. Additionally, characteristics described in the embodiments may not be explicitly described in another contemplated embodiment but are none the less within the clear scope anticipated by the claims.

The invention claimed is:

1. A suspension assembly system comprising: at least two support arms including a first support arm, a second support arm, a linkage and a pivoting bracket wherein the first support arm is configured to couple the linkage from a second support arm to a connection point on the pivoting bracket and the pivoting bracket is connected to the second support arm, not anchored to a reference frame, connecting a shock absorbing assembly to chassis attachment locations and a ground tracking instrument, such that the pivoting bracket provides an angular connection between the support arms and the shock absorbing assembly allowing movement of the support arms, whether of varying length or in non-contiguous pieces functioning dependently, actuating an extension of the shock absorbing assembly, at the connection to the pivoting bracket, to utilize the angular rotation of the pivoting bracket to create a new path line for a shock mount to move independent from a fixed point of the first or second support arm, and the linkage creating a change in the mechanical motion ratio of the shock absorber.

2. The suspension assembly system of claim 1 wherein the first or second support arm is of an A-Frame, J-arm, boxed arm, formed arm, made of multiple support members or any combination thereof.

3. The suspension assembly system of claim 1 wherein the first or second support arm may be of varying lengths or divided into noncontiguous pieces.

4. The suspension assembly system of claim 1 wherein the linkage is connected to the suspension assembly with a ball and socket connection or a connection that allows rotation around one or more axes.

5. The suspension assembly system of claim 1 wherein the ground tracking instrument is a ski, slider, wheel, tread, track, sled, or float.

6. The suspension assembly system of claim 1 wherein the pivoting bracket is linear, curved, box shaped, or "L" shaped.

7. The suspension assembly of claim 1 wherein the linkage is a rigid rod between the first or second support arm and the pivoting bracket wherein the connections to the rigid rod are ball and socket, ball or roller bearings or bushings or other full or partially rotating mechanical connection or any combination thereof.

* * * * *